United States Patent [19]

Tanaka et al.

[11] Patent Number: 4,868,044

[45] Date of Patent: Sep. 19, 1989

[54] LAMINATED STRUCTURE COMPRISING NON-CROSSLINKED FOAM AS SUBSTRATE

[75] Inventors: Haruhiko Tanaka, Ohtake; Fukashi Kagawa, Yamaguchi; Kouji Nakashima, Hiroshima, all of Japan

[73] Assignee: Shell Oil Company, Houston, Tex.

[21] Appl. No.: 241,644

[22] Filed: Sep. 8, 1988

[30] Foreign Application Priority Data

Sep. 11, 1987 [JP]  Japan ................................ 62-227808

[51] Int. Cl.$^4$ ................................................ B32B 3/26
[52] U.S. Cl. .............................. 428/304.4; 428/319.3; 428/319.7
[58] Field of Search ............... 428/304.4, 319.3, 319.7, 428/319.9

[56] References Cited

U.S. PATENT DOCUMENTS

| 4,438,166 | 3/1984 | Gluck et al. | 428/319.1 |
| 4,739,547 | 4/1988 | Tanaka et al. | 521/134 |
| 4,791,143 | 12/1988 | Tanaka et al. | 521/134 |

Primary Examiner—William J. Van Balen

[57] ABSTRACT

A laminated structure comprising:
(1) as a substrate, a non-crosslinked foam layer having an expansion ratio of 1.5 to 5 and composed of polybutene-1 or a blend of 100 parts by weight of polybutene-1 and up to 40 parts by weight of polyproylene and/or up to 30 parts by weight of polyethylene, and
(2) laminated to one or both surfaces of the non-crosslinked foam layer, a film.

18 Claims, No Drawings

LAMINATED STRUCTURE COMPRISING NON-CROSSLINKED FOAM AS SUBSTRATE

BACKGROUND OF THE INVENTION

This invention relates to a laminated structure comprising a non-crosslinked foam and polybutene-1 as a substrate. More specifically, it relates to a laminated structure comprising a non-crosslinked foam as a substrate which has excellent flexibility, sealability, heat resistance, heat-resistant creep characteristics and hygienic property and is suitable as a packing material for bottle closures.

In recent years, cans have been superseded to some extent by bottles as containers for carbonated drinks. It is also desired to replace ampoules for drugs by bottles equipped with screw caps in order to avoid inclusion of glass fragments at the time of opening. Since the caps of these bottles naturally require sealability, cap liners of thermoplastic resins, especially foams of high-pressure low-density polyethylene, are frequently used.

Containers for holding drugs or drinks are usually subjected to a high-temperature sterilizing treatment after they are filled with a liquid. This sterilizing temperature has recently tended to increase in order to shorten the time and increase productivity, and now high temperatures of 100° C. or more are mainly used in the sterilizing treatment.

The high-pressure low-density polyethylene foam mainly used in the past has a disadvantage that it has a low heat-resistant temperature, and cannot be sterilized at high temperatures of 100° C. or more. Polypropylene has better heat resistance, but a uniform foam is extremely difficult to obtain from the polypropylene alone. In an attempt to overcome this defect of the polypropylene, Japanese Patent Publication No. 40167/1981 discloses the addition of 10 to 70% by weight of polybutene to polypropylene. The foam described in this patent document has excellent heat resistance, but since it has a high polypropylene content, it lacks flexibility and has poor sealability with respect to a bottle mouth. Accordingly, this foam is unsuitable as a packing material.

Polybutene-1 is a resin having flexibility, heat resistance and heat-resistant creep characteristics. A foam having a uniform closed cellular structure is very difficult to produce from polybutene-1 alone. Addition of a small amount of polypropylene to it improves the viscoelasticity and therefore foamability of the polybutene-1. However, since the range of temperatures suitable for foaming the resulting blend is very narrow, it is very difficult to expand and mold the blend continuously. For continuous expansion and molding, a special screw or die must be used.

It is an object of this invention to provide a laminated structure comprising a non-crosslinked foam layer of a polymer composed mainly of polybutene-1 as a substrate.

Another object of this invention is to provide a laminated structure having excellent flexibility, sealability, heat resistance, heat-resistant creep characteristics and hygienic property.

Still another object of this invention is to provide a laminated structure comprising a non-crosslinked foam as a substrate and being suitable as a packing material for bottle closures or the like.

Other objects of this invention along with its advantages will become apparent from the following description.

SUMMARY OF THE INVENTION

In accordance with this invention, the objects and advantages of the invention are achieved firstly by a laminated structure comprising:

(1) as a substrate, a non-crosslinked foam layer of polybutene-1 having an expansion ratio of 1.5 to 5, and (2) laminated to one or both surfaces of the non-crosslinked foam layer, a film which can be either a resin film having a melting point or a softening point of at least 100° C. or an aluminum foil.

DETAILED DESCRIPTION OF THE INVENTION

The polybutene-1 used in this invention may be a homopolymer of butene-1 or a copolymer of butene-1 with not more than 20 mole %, preferably not more than 10 mole %, of another alpha-olefin having 2 to 20 carbon atoms. Examples of the other alpha-olefin having 2 to 20 carbon atoms are ethylene, propylene, 4-methyl-pentene-1, hexene-1, octene-1, decene-1, tetradecene-1, and octadecene.

Polybutene-1 has a melt flow rate (MFR, measured in accordance with ASTM D-1238, E) of preferably 0.05 to 50 g/10 minutes, more preferably 0.1 to 20 g/10 minutes. Polybutene-1 having an MFR of less than 0.05 g/10 minutes tends to be difficult to melt-extrude at the time of expansion and molding. On the other hand, polybutene-1 having an MFR of more than 50 g/10 minutes has a low melt viscosity and tends to have inferior foamability.

Advantageously, the polybutene-1 is a crystalline polymer having a crystal melting point of preferably at least 100° C, more preferably at least 120° C.

The non-crosslinked foam layer of polybutene-1 constituting the laminated structure of the invention has an expansion ratio of 1.5 to 5. If the expansion ratio is less than 1.4, the non-crosslinked foam lacks flexibility and has poor sealability with respect to a mouth portion of a container such as a bottle. If it exceeds 5, the non-crosslinked foam has inferior compression creep characteristics and tends to have poor long-term sealability. The preferred expansion ratio of the non-crosslinked foam layer is 1.7 to 3.

The non-crosslinked foam layer preferably has a thickness of 0.5 to 3 mm.

In the production of a foam from a crystalline polyolefin such as polybutene by extrusion foaming and molding, the right temperature range for foaming is usually lower than the melting point of the resin. The resin, therefore, begins to crystallize at the temperature at which extrusion foaming and molding is carried out, and becomes very unstable. For this reason, the range of temperatures suitable for molding the crystalline polyolefin decreases in viscosity, an increase in apparent expansion ratio even at an expansion ratio of as low as 2 to 3 leads to an increase in the proportion of open cells formed. Even if an attempt is made to avoid crystallization during molding by lowering the molding temperature, the resulting foam has a high content of open cells and therefore has very poor sealability as a packing material for a bottle closure or the like.

The present invention is based on the discovery that polybutene-1 has flexibility and excellent heat-resistant creep characteristics, and a foamed product from it retains the excellent properties of the resin even when it contains some open cells.

The laminated structure of the present invention comprises the above non-crosslinked foam layer as a substrate, and laminated to its one or both surfaces, a resin film or an aluminum foil, and thus has greatly improved sealability while retaining the properties required of a packing material.

The non-crosslinked foam may be produced, for example, by a so-called extrusion expansion method which comprises extruding the polybutene-1 containing a blowing agent from a die in the molten or softened state thus subjecting the resin to pressure variations from high to normal atmospheric pressures and expanding the gas formed from the blowing agent. The amount of the blowing agent used in the above extrusion foaming method is usually 0.2 to 5 parts by weight, preferably 0.4 to 2 parts by weight, per 100 parts by weight of the polybutene-1. If the amount of the blowing agent is less than 0.2 part by weight, the expansion ratio is low, and a good foamed product may not be obtained. If it exceeds 5 parts by weight, the expansion ratio becomes high, and the compression creep characteristics of the product are deteriorated and its long-term sealability as a packing material is poor.

Specific examples of the blowing agent used in this invention include evaporated blowing agents, for example fluorinated aliphatic hydrocarbons such as trichloromonofluoromethane and dichlorotetrafluoroethane, and aliphatic hydrocarbons such as propane, methyl chloride, isobutane, pentane and hexane., and decomposable blowing agents such as sodium bicarbonate, ammonium carbonate, azodicarbonamide, barium azodicarboxylate, N,N'-dinitrosopentamethylenetetramine, 4,4-hydroxybis(benzenesulfonyl hydrazide), diphenylsulfone-3,3-di-sulfonyl hydrazide, p-toluenesulfonyl semicarbazide, trihydrazinotriazine and biurea. Of these blowing agents, the evaporable blowing agents are preferred because they completely evaporate and leave no residual matter and thus do not give rise to a hygienic problem. Of the decomposable blowing agents, azodicarbonamide and sodium bicarbonate are preferred.

In addition to the blowing agent, additives normally used for polyolefins, such as heat stabilizers, slip agents and antistatic agents, may be incorporated in the composition for forming the non-crosslinked foam in amounts which do not impair the objects of this invention. The non-crosslinked foam may be obtained in various forms such as a sheet, pipe, rod, or tube by changing the die of the extruder.

The laminated structure of this invention has a resin film or an aluminum foil laminated to one or both surfaces of the non-crosslinked foam layer.

The resin film may be a film of a resin having a melting point or a softening point of at least 100° C. The resin may be, for example, a crystalline polymer having a melting point of at least 100° C. such as polyethylene, polypropylene, polybutene, polyethylene terephthalate, nylon or poly(methylpentene) or an amorphous polymer having a softening point of at least 100° C., preferably at least 120° C., such as polycarbonate. The resin film preferably has a thickness of 3 to 200 micrometers, especially 10 to 70 micrometers.

The aluminum foil preferably has a thickness of 3 to 200 micrometers, especially 10 to 70 micrometers.

The laminated structure of the invention may be produced by various methods, for example, (a) separately preparing the non-crosslinked foam layer, and the resin film or the aluminum foil, and bonding them by using an adhesive or a resin; (b) physically laying these films and passing the assembly between two hot rolls without using an adhesive, and thereby bonding the films by heat fusion., or (c) an extrusion coating method which comprises extruding a molten resin from an extruder directly on the surface of the non-crosslinked foam layer previously formed.

In the laminated structure comprising the non-crosslinked foam layer as a substrate in accordance with this invention, the resin film or the aluminum foil may be laminated to one surface of the non-crosslinked foam layer, or resin films, or aluminum foils, or a resin film and an aluminum foil may be laminated to both surfaces of the non-crosslinked foam layer.

Investigations of the present inventors have shown that the objects of tis invention can be equally achieved even when the non-crosslinked foam is prepared not from the polybutene-1 alone, but from the blend of the polybutene-1 with polyproypylene and/or polyethylene in a specific ratio.

Accordingly, the present invention secondly provides a laminated structure comprising:

(1) as substrate, a non-crosslinked foam layer having an expansion ratio of 1.5 to 5 and composed of a blend of 100 parts by weight of polybutene-1 and up to 40 parts by weight of polypropylene and/or up to 30 parts by weight of polyethylene, and {2) laminated to one or both surfaces of the non-crosslinked foam layer, a resin film having a melting point or a softening point of at least 100° C. or an aluminum foil.

The polybutene-1 used in this second laminated structure of this invention may be the same as used in the first embodiment described above.

The polypropylene may be a homopolymer of propylene or a copolymer of propylene with up to 30 mole % of another alpha-olefin. Examples of alpha-olefins other than propylene are ethylene, butene-1,4-methyl-pentene-1, hexene-1, octene-1, and decene-1.

Polypropylene has a melt flow rate (MFR: ASTM D 1238, L) of preferably 0.1 to 50 g/10 minutes, more preferably 0.5 to 20 g/10 minutes. Polypropylene having an MFR of less than 0.1 g/10 minutes tends to be difficult to melt-extrude during foaming and molding, and polypropylene having an MFR of more than 50 g/10 minutes has a low melt viscosity and tends to have poor foamability. Both of these polypropylenes are undesired.

Polypropylene is used in an amount of up to 40 parts by weight per 100 parts by weight of polybutene-1. Inclusion of polypropylene increases thermal resistance. But if the amount of polypropylene exceeds 40 parts by weight, the resulting foamed product is excessively hard and has poor sealability with respect to a mouth portion of a container such as a bottle. Hence, it is not practicable as a packing material.

The preferred amount of polypropylene is 1 to 20 parts by weight on the same basis.

Polyethylene may be a homopolymer of ethylene or a copolymer of ethylene with up to 20 mole % of another alpha-olefin. Examples of alpha-olefins other than ethylene are propylene, butene-1, 4-methyl-pentene-1, hexene-1, octene-1, and decene-1.

Polyethylene has a melt flow rate (MFR: ASTM D 1238, E) of preferably 0.1 to 50 g/10 minutes, more preferably 0.5 to 20 g/10 minutes. Polyethylene having an MFR of less than 0.1 g/10 minutes tends to be difficult to melt-extrude at the time of foaming and molding. On the other hand, polethylene having an MFR of more than 50 g/10 minutes tends to have inferior foamability. Both of these polyethylenes are undesired.

Polyethylene is used in an amount of up to 30 parts by weight per 100 parts by weight of polybutene-1. Since polyethylene has a high melt tension, its addition generally results in stable formation of a foamed product with a smooth surface. If, however, the content of polyethylene in the foamed product exceeds 30 parts, the foamed product tends to have reduced thermal resistance.

The preferred amount of polyethylene is 0.2 to 20 parts by weight on the same basis.

Both polypropylene and polyethylene are preferably crystalline. When they are used in combination, the advantageous total amount is up to 70 parts by weight, preferably 10 to 50 parts by weight.

It should be understood that the description of the first laminated structure of the invention given above is equally applicable to the second laminated structure of the invention.

A packing material for a bottle or the like may be produced from the laminated structure of the invention by, for example, punching out a packing of a predetermined shape from a sheet or rod of the laminated structure, and if required, fitting it into a metallic shell of a crown cap or a cap, or bonding it with an adhesive or otherwise.

Since the laminated structure has excellent flexibility, sealability, thermal resistance, heat-resistant creep characteristics and hygienic property, it can be suitably used as a packing material for bottle closures such as crown caps, pilfer-proof caps and side seal caps. In addition, since this laminated structure can be subjected to high-temperature sterilizing treatment and has good sealability, it can be favorably used in caps of containers for holding drugs and carbonated drinks.

The following examples illustrate the present invention more specifically. The invention, however, is not limited to these examples.

EXAMPLE 1

(1) One Hundred parts of a homopolymer of butene-1 (PB for short) having an MFR of 0.4 g/10 minutes, an intrinsic viscosity of 2.6 dl/g and a melting point of 125° C., 0.2 par by weight of azodicarbonamide (ADCA for short) ("Vinyfor AC#3", a tradename for a product of Eiwa Chemical Industry Co., Ltd.) and 0.3 part of sodium bicarbonate as blowing agents were mixed by a tumbler. The mixture was melt-kneaded in a single-screw extruder (kept at a temperature of 210° C.) and extruded from a die (kept at a temperature of 150° C.) for pipe formation to obtain a pipe-like foamed product. The foamed product was cut open to obtain a sheet-like foamed product having a thickness of 2 mm.

The resulting sheet-like foamed product was laid together with a low-temperature-sealable biaxially stretched polypropylene film (HS-OPP for short) having a thickness of 25 micrometers, and the assembly was passed between two rolls heated at 140° C. to induce heat fusion and give a laminated structure of the non-crosslinked foamed product and the resin film.

The HS-OPP film was obtained by coating a composition composed of polybutene-1 and polypropylene as a surface layer on one surface of a polypropylene substrate to a thickness of about 3 micrometers, and was easily bonded to the non-crosslinked foamed product by bonding under heat and pressure.

(2) Evaluation of the packing property of the laminated structure as a cap liner A packing material having a diameter of 27.5 mm was pushed out from the above sheet-like foamed product, and fitted in the inside surface of an aluminum cap having a diameter of 28 mm. Hot water at 80° C. (110 ml) was poured into a glass bottle having a capacity of 10 ml and a mouth diameter of 22 mm, and immediately then, the glass bottle was sealed up with the above cap by using a capping machine (made by Shibasaki Seisakusho). The filled glass bottle was left to stand for 30 minutes in a pressure-sterilizing kettle at 120° C., then withdrawn from the kettle, and laid sideways. The bottle was then allowed to cool at room temperature for 24 hours, and checked for leakage of water filled in it. The durable pressure reduction resistance value and the opening torque value of the glass bottle were measured by the following methods.

Durable pressure reduction resistance value (mmHg)

A pressure gauge was thrust into the cap of the glass bottle, and the internal pressure of the bottle was measured. If the bottle was completely sealed up, the internal pressure of the bottle should have been the balance (334 mmHg) between the vapor pressure 355 mmHg) of water at 80° C. and its vapor pressure (21 mmHg) at room temperature (23° C.). Durable pressure reduction resistance values closer to 334 mmHg show better sealability. If there is leakage, the pressure is 0 mmHg.

Opening torque value (kg-cm)

The torque of the cap of the glass bottle was measured at the time of cap opening by using a torque meter, and made a measure of the ease of cap opening. To improve sealability with a screw cap, it is generally necessary to apply it tightly. But if it is applied too tightly, it cannot be removed easily by a man's power. Usually, the cap torque value permitting easy opening even by aged people, women and children are regarded as less than 10 kg-cm.

The packing properties of the laminated structure obtained in this example as a cap liner are shown in Table 1.

EXAMPLE 2

A laminated structure of a non-crosslinked foamed product and a resin film was produced in the same way as in Example 1 except that 20 parts by weight of a propylene/ethylene random copolymer (PP for short) having an ethylene content of 3 mole % and an MFR of 0.5 g/10 minutes was added to 100 parts of the homopolymer of butene-1.

The packing properties of the resulting laminated structure as a cap liner are shown in Table 1.

EXAMPLE 3

A laminated structure of a non-crosslinked foamed product and a resin film was produced in the same way as in Example 1 except that 20 parts by weight of high-pressure low-density polyethylene (PE for short) having a melting point of 117° C. and an MFR of 2.5 g/10 minutes was added to 100 parts of the homopolymer of butene-1.

The packing properties of the resulting laminated structure as a cap liner are shown in Table 1.

EXAMPLE 4

A laminated structure of a non-crosslinked foamed product and a resin film was produced in the same way as in Example 1 except that 20 parts by weight of each of PP and PE used in Examples 2 and 3 was added to 100 parts of the homopolymer of butene-1.

The packing properties of the resulting laminated structure as a cap liner are shown in Table 1.

COMPARATIVE EXAMPLES 1–4

In Examples 1 to 4, the HS-OPP film was not laminated to the resulting non-crosslinked foamed products, and the packing properties of these foamed products alone as a cap liner were measured. The results are shown in Table 1.

TABLE 1

| | Non-crosslinked foam | | | | | Resin film layer | | Packing properties (after heat-treatment) | | |
| --- | --- | --- | --- | --- | --- | --- | --- | --- | --- | --- |
| | Resin | | | Blowing agent | | | | Durable pressure reduction | | |
| | PB (parts by weight) | PP (parts by weight) | PE (parts by weight) | ADCA (parts by weight) | Sodium bicarbonate (parts by weight) | Type of the resin film | Thickness of the resin film | resistance value (mmHg) | Opening torque (kg-cm) | Leakage |
| Example 1 | 100 | — | — | 0.2 | 0.3 | HS-OPP | 25 | 230 | 9 | No |
| Example 2 | 100 | 20 | — | 0.2 | 0.3 | HS-OPP | 25 | 190 | 7 | No |
| Example 3 | 100 | — | 20 | 0.2 | 0.3 | HS-OPP | 25 | 170 | 7 | No |
| Example 4 | 100 | 20 | 20 | 0.2 | 0.3 | HS-OPP | 25 | 210 | 8 | No |
| Comp. Example 1 | 100 | — | — | 0.2 | 0.3 | None | — | 0 | 8 | Yes |
| Comp. Example 2 | 100 | 20 | — | 0.2 | 0.3 | None | — | 0 | 6 | Yes |
| Comp. Example 3 | 100 | — | 20 | 0.2 | 0.3 | None | — | 0 | 7 | Yes |
| Comp. Example 4 | 100 | 20 | 20 | 0.2 | 0.3 | None | — | 0 | 7 | Yes |

It is seen from Table 1 that when the laminated structures in accordance with this invention were used as cap liners, they showed excellent durable pressure reduction resistance values and caused no liquid leakage, but that when the non-crosslinked foamed products were used alone as cap lines, the durable pressure reduction resistance values were 0 and they showed poor sealability, and furthermore, liquid leakage occurred and the packing properties of these non-crosslinked foamed products were below the tolerable level.

What is claimed is:

1. A laminated structure comprising:
   (1) as a substrate, a non-crosslinked foam layer of polybutene-1 having an expansion ratio of 1.5 to 5, and
   (2) laminated to at least one surface of the non-crosslinked foam layer, a film.

2. The laminated structure of claim 1 wherein the film is a resin film having a softening point of at least 100° C.

3. The laminated structure of claim 1 wherein the film is an aluminum foil.

4. The laminated structure of claim 1 in which the polybutene-1 is a homopolymer of butene-1 or a copolymer of butene-1 with another alpha-olefin having 2 to 20 carbon atoms.

5. The laminated structure of claim 1 in which the polybutene-1 has a melt flow rate of 0.05 to 50 g/10 minutes.

6. The laminated structure of claim 1 in which the non-crosslinked foam layer has an expansion ratio of from 1.7 to 3.

7. The laminated structure of claim 1 in which the non-crosslinked foam layer has a thickness of 0.5 to 30 mm.

8. The laminated structure of claim 1 in which the film is a film of a resin selected form the group consisting of polyethylene, polypropylene, polybutene, polyethylene terephthalate, nylon, polymethylpentene and polycarbonate.

9. The laminated structure of claim 1 in which the film has a thickness of 3 to 200 micrometers.

10. A laminated structure comprising:
    (1) as a substrate, a non-crosslinked foam layer having an expansion ratio of 1.5 to 5 and composed of a member of the group consisting of a blend of 100 parts by weight of polybutene-1 and up to 40 parts by weight of polypropylene and up to 30 parts by weight of polyethylene, and a blend of 100 parts by weight of polybutene-1 and up to 40 parts by weight of polypropylene, and
    (2) laminated to at least one surface of the non-crosslinked foam layer, a film.

11. The laminated structure of claim 10 wherein the film is a resin film having a softening point of at least 100° C.

12. The laminated structure of claim 10 wherein the film is an aluminum foil.

13. The laminated structure of claim 10 in which the polypropylene is a homopolymer of propylene or a copolymer of propylene with up to 30 mole % of another alpha-olefin.

14. The laminated structure of claim 10 in which the polypropylene has a melt flow rate of 0.1 to 50 g/10 minutes.

15. The laminated structure of claim 10 in which the amount of the polypropylene is 1 to 20 parts by weight of polybutene-1.

16. The laminated structure of claim 10 in which the polyethylene is a homopolymer of ethylene or a copolymer of ethylene with up to 20 mole % of another alpha-olefin.

17. The laminated structure of claim 10 in which the polyethylene has a melt flow rate of 0.1 to 50 g/10 minutes.

18. The laminated structure of claim 10 in which the amount of polyethylene is 0.2 to 20 parts by weight per 100 parts by weight of polybutene-1.

* * * * *